March 17, 1925.
J. M. REDINGER
1,529,917
CUTTER
Filed March 11, 1924
2 Sheets-Sheet 1
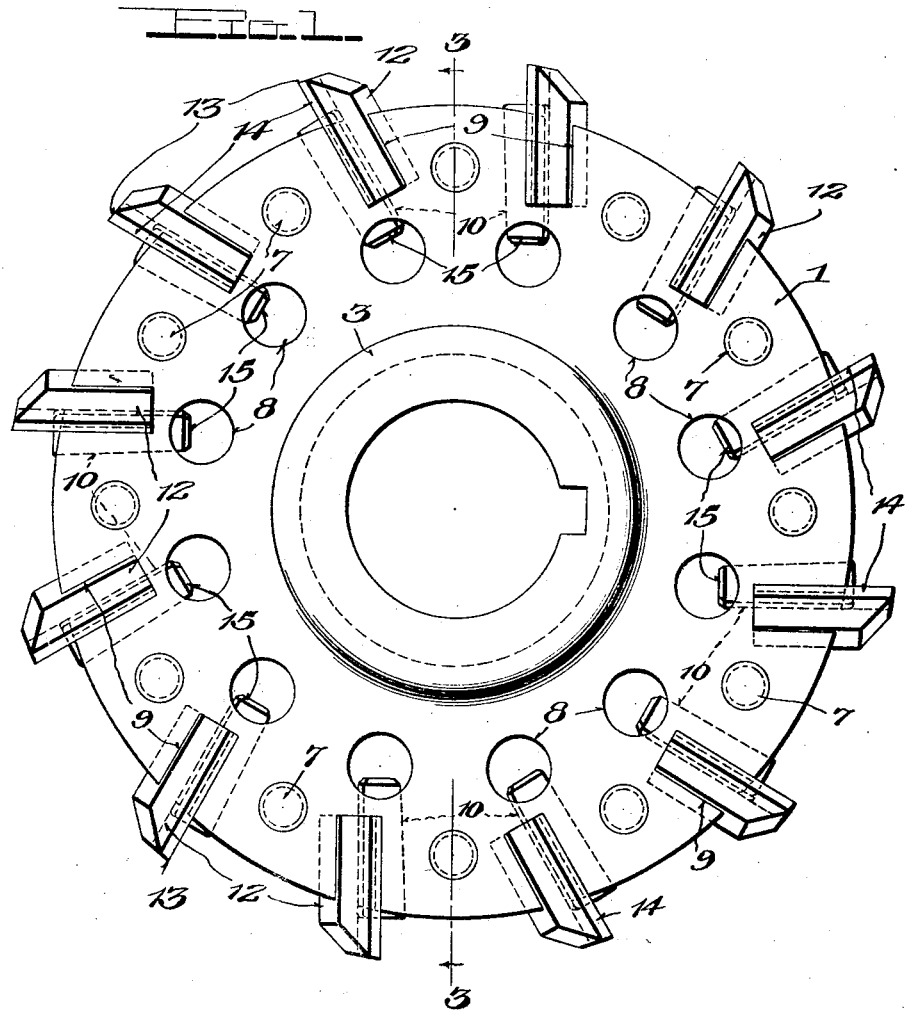
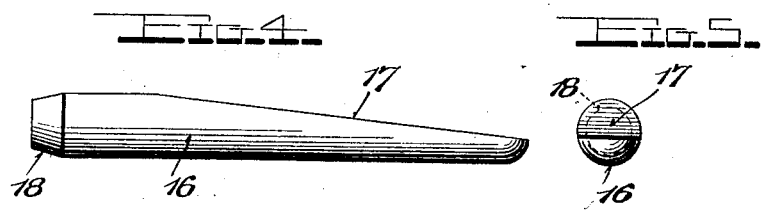
Inventor
Joseph M. Redinger
By Joseph A. Miller
Attorney March 17, 1925.  J. M. REDINGER  1,529,917
CUTTER
Filed March 11, 1924   2 Sheets-Sheet 2
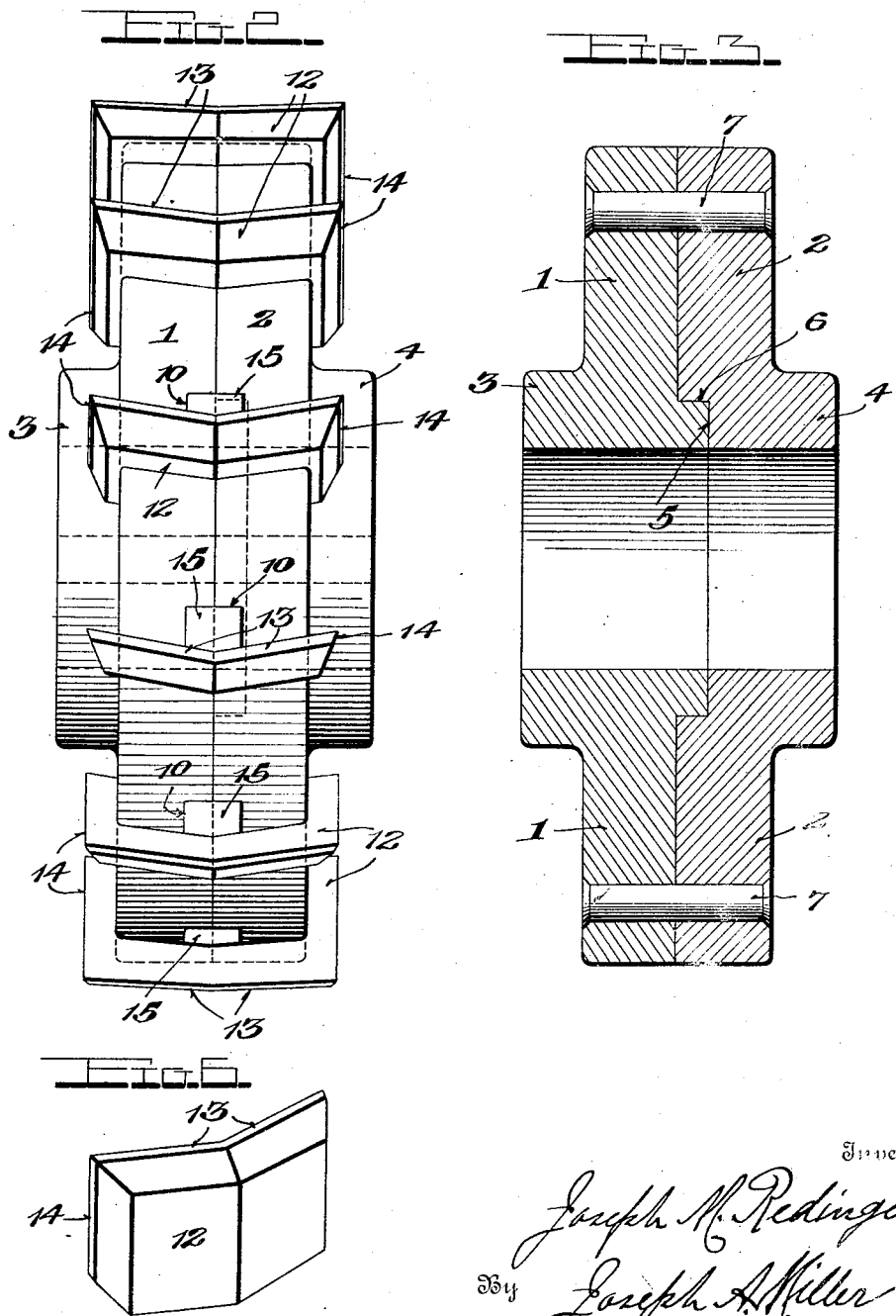

Patented Mar. 17, 1925.

1,529,917

UNITED STATES PATENT OFFICE.

JOSEPH M. REDINGER, OF PROVIDENCE, RHODE ISLAND.

CUTTER.

Application filed March 11, 1924. Serial No. 698,461.

*To all whom it may concern:*

Be it known that I, JOSEPH M. REDINGER, a citizen of the United States, residing at Providence, in the county of Providence and State of Rhode Island, have invented new and useful Improvements in Cutters, of which the following is a specification.

This invention relates to certain new and useful improvements in cutters and pertains more especially to cutters employed in milling metal surfaces.

The primary object of the present invention is to provide a cutter of this type which embodies novel cutters and means for removably mounting same on the cutter body.

A further object of the invention is to provide means for enabling the cutters to be easily and quickly removed from the cutter body.

The invention still further aims to provide a cutter structure wherein either or both sides of the cutters can be used for milling.

The invention also aims to provide a milling cutter structure wherein the individual cutters or cutting teeth are firmly secured in position by means of a simple and economical nature, involving a minimum number of parts, and has still further and other objects, which will be later set forth and manifested in the course of the following description.

In the drawings:

Figure 1, is a side elevation of the invention,

Figure 2 is a side edge elevation;

Figure 3 is a section on line 3—3 of Figure 1.

Figure 4, is a side elevation of the key employed in removal of the cutters or cutter teeth.

Figure 5, is a rear end elevation of Figure 4 and

Figure 6 is a detail perspective view of one of the cutters or cutting teeth.

In proceeding in accordance with the present invention, the body of the cutter is preferably formed of a pair of sections 1 and 2, having hub portions 3 and 4, the section 1 having an inner projecting hub portion 5 received in an opening 6 of a corresponding form provided for its reception in the section 2. Transverse bolts or pins 7 extend through the sections and headed at their ends into engagement therewith so as to rigidly connect the sections and to form a rigid body. The sections 1 and 2 are further formed with transverse openings 8 which extend entirely through same at points between the hub and the periphery of the body.

The periphery of the body is further formed with inwardly extending slots 9 which are of somewhat V-form and which extend through the outer side faces of the body as to accommodate the cutters or teeth 12 therein. The bottoms of the slots 9 terminate in space relation to the openings 8. Keyways 10 are formed in the periphery of the body and at one side thereof communicate with the slots 9 and at their inner ends communicate with the openings 8.

The cutters or cutting teeth 15 are of somewhat V-form and have top cutting edges 13 and similar side or end cutting edges 14, the cutters being received in the slots 9 and bottoming therein, the side cutting edges 14 projecting outwardly beyond the outer side faces of the sections 1 and 2, as clearly shown in Figures 1 and 2 of the drawings.

The keys 15 are of tapering form and have a tight frictional fit in the keyways 10 and have their inner side faces bevelled to conform to the adjacent concave side face of the cutting blade or tooth and to also have tight frictional engagement therewith.

When the keys 15 are in normal locking relation to the cutting blades or cutters, their inner ends project into the openings 8, and for the purpose of dislodging the keys, to thus allow of removal of the cutters, a pin 16 is employed, which as shown in Figures 4 and 5, is formed with a tapering face 17, affording a wedge-shaped formation. The pin 16 is formed to fit the opening 8, and has a head 18 to receive hammer blows, whereby upon driving of the pin in or through the opening, the inner ends of the keys 15 will be engaged by the wedge or tapering face 17 of the pin and will be moved out of engagement with the cutters, thereby allowing removal of the latter.

Due to the V-formation of the cutter blades, the inherent concave central portions thereof form parts which engage the convex V-portions of the keys and thus hold the blades against movement laterally of the body.

Having thus described my invention, what I claim as new and desire to secure by Letters Patent is:—

1. In a cutter, a sectional body, the sections of which have outwardly extending hub-forming portions on their outer faces, the inner face of one section having a projecting hub-forming part and the inner face of the other section having a shouldered recess to receive said latter hub-forming part, transverse rivets extending through the sections and headed into engagement therewith, said body having transverse openings and slots of substantially V-form extending inwardly from the periphery of the body and through the sides of the body and spaced at their inner ends from the openings, said body further having tapering keyways which extend into the respective openings and communicate with the concaved sides of the V-slots, V-shaped cutters in the V-slots having longitudinal and side cutting edges, the latter extending beyond the respective outer faces of the sides of the body, keys in the keyways extending at their inner ends into the openings.

2. In a cutter, a body having transverse openings and slots of approximately V-form extending inwardly from the body periphery and through the sides of the body and spaced at their inner ends from the openings, said body also having tapering keyways which extend into the respective openings and communicate with the concaved sides of the slots, V-shaped cutters in the slots having longitudinal and side cutting edges, the latter extending outwardly beyond the respective outer side faces of the body, and keys in the keyways extending at their inner ends into the respective openings.

3. A cutter including a body having a substantially radial slot formed with side parts which relatively diverge, a cutter having corresponding diverging cutting edges conformably received in the slot, and means to secure the cutter in the slot with its said diverging cutting edges extending transversely of and beyond the periphery of the body.

4. A cutter including a body having a substantially V-shaped peripheral slot, a substantially V-shaped cutter in the slot, said body having a substantially radial keyway which communicates with the concave side of the slot and at the angle thereof, and a key in the keyway having a face conformably engaged with the concave side of the cutter at and in the angle thereof.

In testimony whereof I have signed my name to this specification in the presence of two subscribing witnesses.

JOSEPH M. REDINGER.

Witnesses:
CHARLES M. FREITAG,
H. B. ARNOLD.